(12) United States Patent
Kumar et al.

(10) Patent No.: US 12,276,953 B2
(45) Date of Patent: Apr. 15, 2025

(54) MULTI-MARKET RESOURCE DISPATCH OPTIMIZATION

(71) Applicant: MICROSOFT TECHNOLOGY LICENSING, LLC, Redmond, WA (US)

(72) Inventors: Peeyush Kumar, Seattle, WA (US); Lucien Werner, Pasadena, CA (US); Shivkumar Kalyanaraman, Bangalore (IN); Srinivasan Iyengar, Bangalore (IN); Weiwei Yang, Redmond, WA (US); Tanuja Hrishikesh Ganu, Bangalore (IN); Ranveer Chandra, Kirkland, WA (US); Riyaz Pishori, Sammamish, WA (US); Upendra Singh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 377 days.

(21) Appl. No.: 17/826,335

(22) Filed: May 27, 2022

(65) Prior Publication Data

US 2023/0236559 A1 Jul. 27, 2023

(30) Foreign Application Priority Data

Jan. 24, 2022 (IN) .............................. 202241003868

(51) Int. Cl.
*G05B 19/042* (2006.01)
(52) U.S. Cl.
CPC .... *G05B 19/042* (2013.01); *G05B 2219/2639* (2013.01)
(58) Field of Classification Search
CPC .......... G05B 19/042; G05B 2219/2639; G06Q 10/04; G06Q 30/0201
See application file for complete search history.

(56) References Cited

U.S. PATENT DOCUMENTS

| | | | |
|---|---|---|---|
| 8,311,681 B1* | 11/2012 | Marcus .................. | G05B 15/02 |
| | | | 700/286 |
| 2012/0278220 A1* | 11/2012 | Chassin ................. | G06Q 40/04 |
| | | | 705/37 |

(Continued)

OTHER PUBLICATIONS

"Wärtsilä is delivering a 70MW energy storage system in California to optimise renewable energy system performance and maximise ROI", Retrieved from: https://www.wartsila.com/media/news/29-04-2020-wartsila-is-delivering-a-70mw-energy-storage-system-in-california-to-optimise-renewable-energy-system-performance-and-maximise-roi-2696780, Apr. 29, 2020, 6 Pages.

(Continued)

*Primary Examiner* — Mohammad Ali
*Assistant Examiner* — Vincent W Chang
(74) *Attorney, Agent, or Firm* — Newport IP, LLC; Jacob P. Rohwer

(57) ABSTRACT

The techniques disclosed herein enable systems to enable multi-market optimization of renewable energies using data-driven models. To achieve this, a model retrieves a current state from a resource generation system and associated resource markets. The model can then compute a policy based on the state as well physical and technical constraints. The policy defines various actions that direct operation of the resource generation system such as resource production and dispatch to markets. Applying the policy to the resource generation results in a modified state which the model extracts along with a measure of optimality which quantifies the success of the policy. Based on these metrics, the model can generate an updated iteration of the policy defining a different set of actions. In this way, the model can gradually develop an optimal policy for controlling the resource generation system.

13 Claims, 9 Drawing Sheets

(56) References Cited

U.S. PATENT DOCUMENTS

| | | | |
|---|---|---|---|
| 2016/0273518 A1* | 9/2016 | Chen | F03D 7/048 |
| 2019/0325533 A1* | 10/2019 | Perry | G06Q 10/08345 |
| 2019/0385182 A1* | 12/2019 | Price | H02J 3/003 |

OTHER PUBLICATIONS

Arulkumaran, et al., "Deep reinforcement learning: A brief survey", In Journal of IEEE Signal Processing Magazine, vol. 34, Issue 6, Nov. 2017, pp. 26-38.

Cao, et al., "Deep Reinforcement Learning-Based Energy Storage Arbitrage With Accurate LithiumIon Battery Degradation Model", In Journal of IEEE Transactions on Smart Grid, vol. 11, Issue 5, Sep. 2020, pp. 4513-4521.

Chen, et al., "Enforcing Policy Feasibility Constraints through Differentiable Projection for Energy Optimization", In Repository of arXiv:2105.08881v1, May 19, 2021, 12 Pages.

Chen, et al., "Reinforcement learning for decision-making and control in power systems: Tutorial, review, and vision", In Repository of arXiv:2102.01168v1, Jan. 27, 2021, pp. 1-16.

Mbuwir, et al., "Battery Energy Management in a Microgrid Using Batch Reinforcement Learning", In Journals of Energies, vol. 10, Issue 11, Nov. 12, 2017, 19 Pages.

Oh, et al., "Reinforcement-Learning-Based Energy Storage System Operation Strategies to Manage Wind Power Forecast Uncertainty", In Journal of IEEE Access, vol. 8, Jan. 23, 2020, pp. 20965-20976.

Powell, Warren B., "Clearing the Jungle of Stochastic Optimization", In Journal of Informs, Sep. 2014, pp. 109-137.

Powell, Warren B., "Reinforcement learning and stochastic optimization", In Publication of A John Wiley & Sons, Inc, Jul. 22, 2021, 51 Pages.

Powell, et al., "Tutorial on Stochastic Optimization in Energy—Part I: Modeling and Policies", In Journal of IEEE Transactions on Power Systems, vol. 31, Issue 2, Mar. 2016, pp. 1459-1467.

Shang, et al., "Stochastic dispatch of energy storage in microgrids: An augmented reinforcement learning approach", In Journal of Applied Energy, vol. 256, Issue 4, Mar. 1, 2020, pp. 1-11.

Wang, et al., "Energy storage arbitrage in real-time markets via reinforcement learning", In Proceedings of IEEE Power & Energy Society General Meeting (PESGM), Aug. 5, 2018, 6 Pages.

Willuhn, Marian, "RWE abandons plans for 1.1 GW lignite-fired power station in Germany", Retrieved from: https://www.pv-magazine.com/2019/04/26/rwe-abandons-plans-for-1-1-gw-lignite-fired-power-station-in-germany/, Apr. 26, 2019, 17 Pages.

Yang, et al., "A deep reinforcement learning method for managing wind farm uncertainties through energy storage system control and external reserve purchasing", In International Journal of Electrical Power & Energy Systems, vol. 119, Jul. 2020, pp. 1-11.

Yang, et al., "Reinforcement learning in sustainable energy and electric systems: a survey", In Journal of Annual Reviews in Control, vol. 49, Apr. 9, 2020, pp. 1-19.

Zhang, et al., "Deep reinforcement learning for power system applications: An overview", In CSEE Journal of Power and Energy Systems, vol. 6, Issue 1, Mar. 30, 2020, pp. 213-225.

Zheng, et al., "Safe Reinforcement Learning of Control-Affine Systems with Vertex Networks", In Proceedings of the 3rd Conference on Learning for Dynamics and Control, May 29, 2021, pp. 1-12.

* cited by examiner

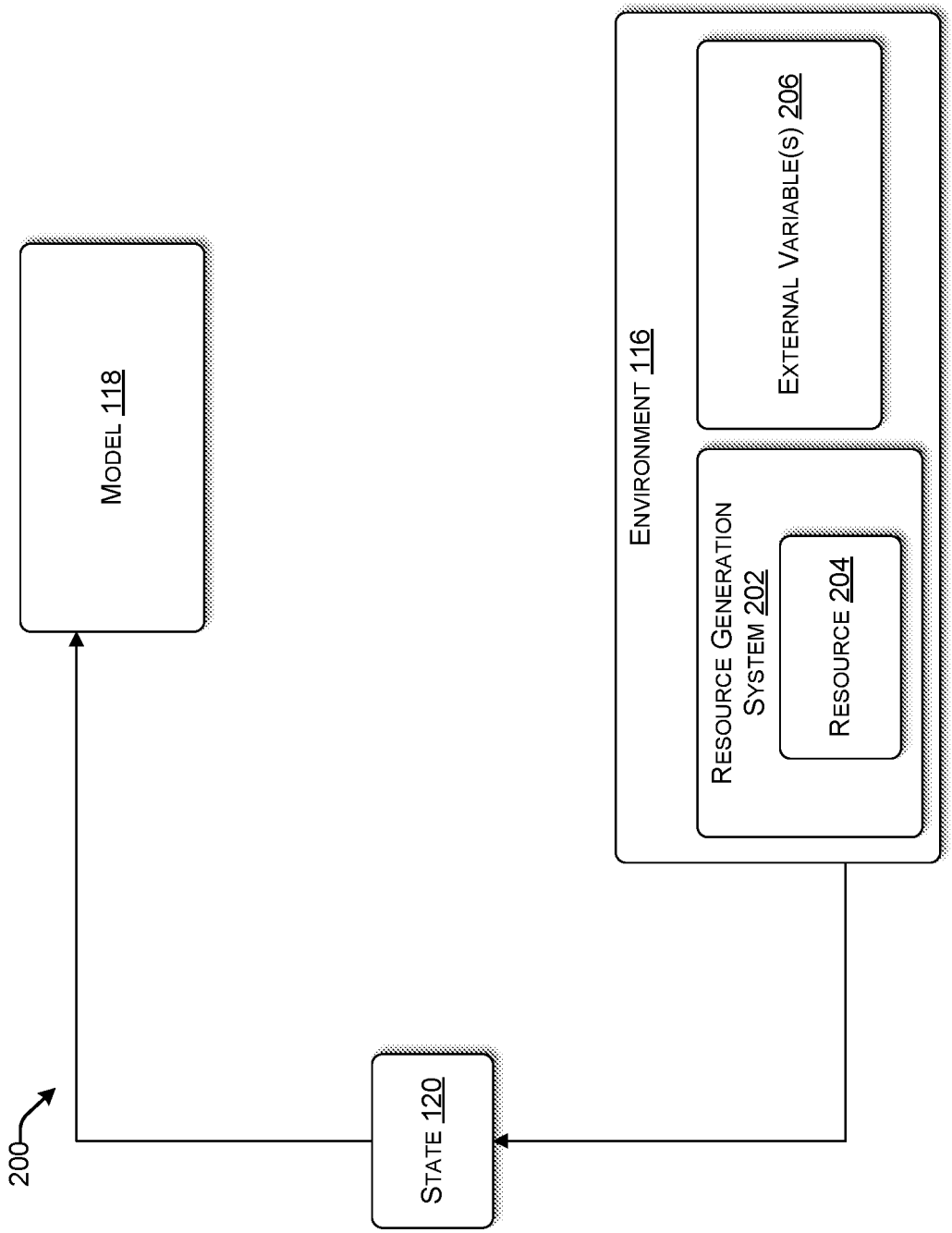

MULTI-MARKET RESOURCE DISPATCH OPTIMIZATION

PRIORITY APPLICATION

The present application is a non-provisional application of, and claims priority to, Indian Provisional Application Serial Number 202241003868 filed on Jan. 24, 2022, the contents of which are hereby incorporated by reference in their entirety.

BACKGROUND

Recent innovations in renewable energy systems, as well as concerns surrounding human induced climate change have greatly accelerated the adoption of renewable energy systems in modern power grids. While fossil fuels such as coal and natural gas continue to account for the majority of electricity generation, renewable energy sources such as wind and solar make up an increasingly large share of overall electricity generation. In a specific example, renewable energy sources provided twenty percent of total electricity generation in the United States in 2020. As various nations aim to meaningfully reduce greenhouse gas emissions, expanded integration of renewable energy sources within the larger power grid represents a key priority.

Unfortunately, while technologies for generating electricity from renewable sources have seen marked improvements in cost and efficiency, significant challenges remain when considering how renewable energy systems can be integrated into existing infrastructure and energy markets. For instance, while wind and solar produce no emissions, these methods of electricity generation are not controllable unlike conventional power plants. Stated another way, the available supply of renewable energy systems can be subject to unpredictable conditions such as the weather and may not always be consistently available. While existing power grid infrastructure can accommodate a small number of renewable energy systems, the variability and uncertainty of renewable energy generation can pose serious challenges to reliability in grids composed mostly of renewable energy. For example, inclement weather typically reduces the generation capacity of solar power panels causing imbalance in the supply and demand of the electrical grid potentially leading to cascading blackouts.

To improve the reliability of renewable energy systems, many operators have turned to energy storage such as batteries or pumped hydro that is collocated with the electricity generation system. In this way, energy storage systems can smooth the fluctuations of renewable energy production ensuring a consistent supply of power. In addition, these energy storage systems enable operators to provide services in a wide variety of energy markets whereas renewable energy systems alone could only supply power in real time. Various energy markets can vary in timescale depending on the associated service. For instance, a power purchase agreement is a long-term contract operating on the scale of decades and includes penalties for non-delivery of power. In another example, operators can operate on the scale of days by committing to the day-ahead market. At even smaller timescales, operators can participate on the scale of hours and even minutes through the real-time energy market and frequency regulation services respectively.

However, optimally managing a combined renewable generation and storage plant across several energy markets is a highly complex task. Considering the volatility of pricing across various energy markets, unpredictable renewable generation capacity, and other uncertain variables, manual management becomes simply unfeasible. In addition, if an operator desires to optimize revenue, the operator is required to implement a rapid analysis of massive amounts of data across markets to determine a plan of action. Thus, there is a need for automated systems that optimally control renewable energy generation and storage systems.

SUMMARY

The disclosed techniques improve the functionality of renewable energy generation and storage systems by introducing a data-driven model that generates a policy for governing resource generation systems based on data extracted from generation systems and associated resource markets. For instance, the model is configured to compute an optimal resource dispatch schedule across several resource markets under uncertain circumstances. As mentioned above, various markets operate on drastically different transaction timescales from decades for power purchase agreements to seconds for frequency regulation services. In the context of renewable power generation, uncertainty arises from the unpredictability of power generation as subject to weather conditions as well as the volatility of energy prices in short-term energy markets such as day-ahead markets. Consequently, as used herein a market includes a resource trading frequency that differs from other markets. As such, the resource price in one market is likely to differ from the resource price in another market. While different markets can be associated with a same geographic region in which the resource is traded, in some instances, different markets can alternatively be associated with different geographic regions in which the resource is traded.

While many examples provided herein are described with respect to a renewable energy system and electricity markets, it is understood in the context of this disclosure that the techniques can be applied to any resource generation system and resource market. For instance, the disclosed techniques may be applied to resource generation entities such as farms in which the produced resource can be an agricultural product such as grain. In this example, the grain can be dispatched to commodity markets having various trading frequencies, pricing, and the like, which are based on supply and/or demand.

In various examples, a model receives data defining a current state of an environment including a resource generation system and various associated resource markets. The state data can define various characteristics of the resource generation system. In one example, the state data defines the available generation capacity, an amount of resource available for dispatch, and other aspects of the generation system. In addition, the state can also include current market conditions such as energy prices of a real-time resource market. The model can utilize any suitable approach such as machine learning (e.g., reinforcement learning), data-driven statistics models, artificial intelligence and the like.

Based on the state data, the model computes a policy defining a series of actions that are to be applied to the resource generation system. In various examples, these actions direct the resource generation system to harvest and hold resources in storage. At a later point in time, another action of the policy directs the resource storage to dispatch the resource to a resource market. Subsequently, the model extracts updated state data from the environment capturing the effects of the policy on the environment as well as other changes. Furthermore, the model extracts a measure of optimality to quantify the success of the policy actions within the environment. In some contexts, the optimality can also be referred to as a reward.

Accordingly, the model analyzes the results of applying the policy and identifies ways to increase the optimality of subsequent policies within the given environment. In this way, the model iteratively generates policies that maximize optimality over time. In contrast to existing solutions, the application of the model enables an operator of a resource generation and storage system to iteratively develop control policies that allow for optimal operation. Stated another way, the model enables the resource generation system to consistently meet market commitments, increase efficiency of the overall power grid, and maximize revenue for the operator of the resource generation system.

In another example of the technical benefit of the disclosed system, the model can be configured with various physical and technical constraints of the resource generation system. The constraints cannot be violated by the policy computed by the model. For example, in the context of renewable energy systems, the model can be configured with a maximum battery capacity. As such, the model will not direct the renewable energy generator to charge the batteries beyond their maximum capacity. In another example, the model can be configured with constraints associated with physical laws such as the conservation of power. In this way, the model can be confined to only generate policies that are safe and realistically feasible for a given system.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 2B illustrates a first state of the system for utilizing a model to compute policies for controlling resource generation and distribution.

DETAILED DESCRIPTION

Figure 1:
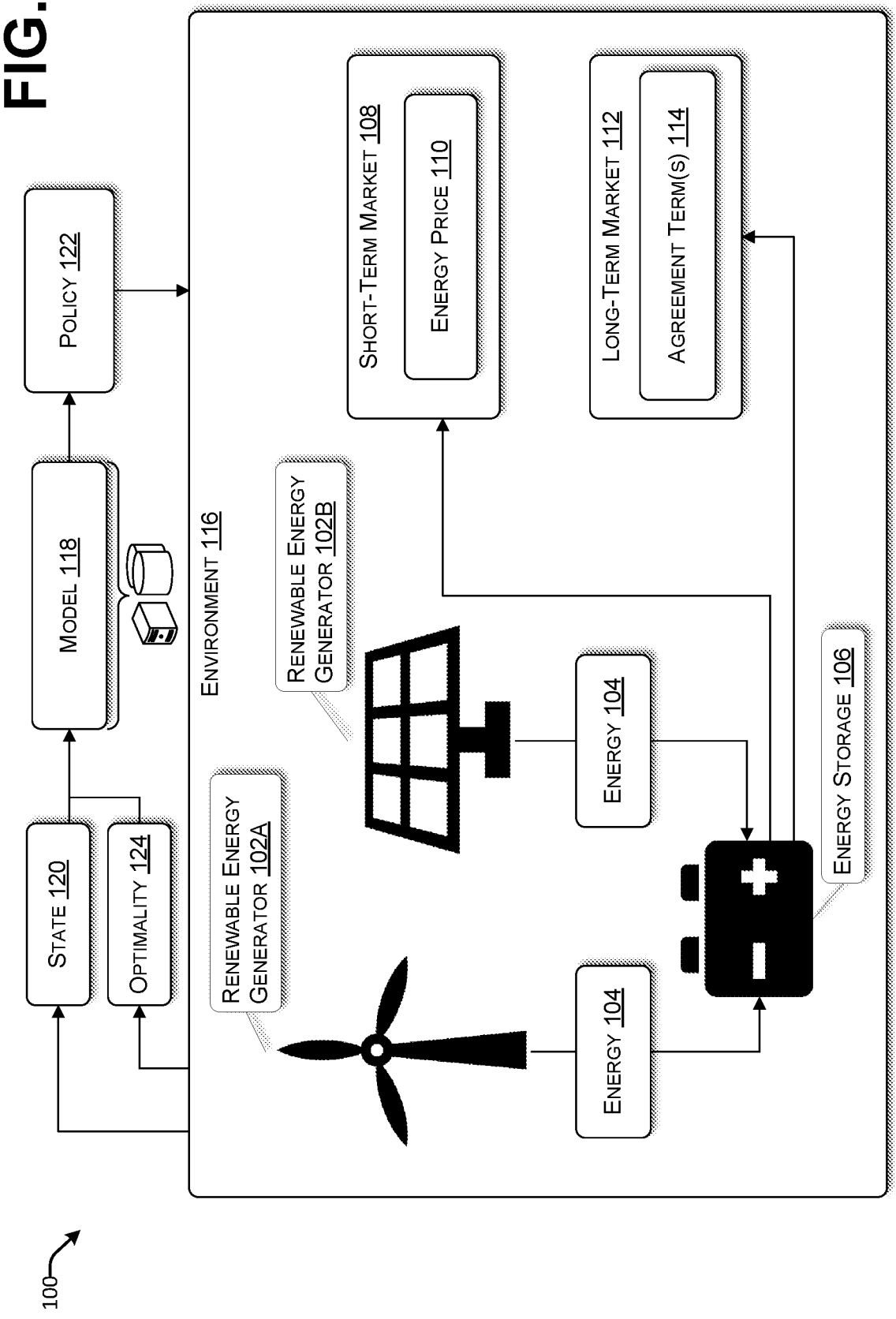
FIG. 1 illustrates an example configuration of a system for utilizing a model to compute policies for controlling resource generation and distribution.

The techniques described herein provide systems for enhancing the operation of resource generation and distribution systems by introducing a data-driven model-based approach for computing control policies. As mentioned above, actions defined by a policy can direct the resource generation system to store and dispatch resources based on various factors such as the demand and price associated with the resource, available generation capacity, and so forth. In addition, while the examples presented herein generally relate to renewable energy storage systems, it should be understood that these techniques can be applied to any resource generation system in which the resource generation rate is variable over time.

The disclosed system addresses several technical challenges associated with proliferation of renewable energy systems. For example, many existing systems accommodate a small amount of renewable energy generation within a larger grid of traditional power generation methods. However, this approach is unsustainable. As mentioned above, to reduce harmful emissions, renewable energy must supplant fossil fuels as the primary source of electricity. Unfortunately, the generation capacity of many renewable energy systems such as wind and solar is subject to weather conditions such as cloud cover or low wind speeds. Stated another way, the amount of power a renewable energy system can produce at any point in time is uncertain thereby posing a threat to overall reliability.

To ensure a steady supply of electricity, many operators augment renewable energy generation with storage systems such as batteries, allowing the system to dispatch power according to demand. However, in addition to providing power in real-time, modern power systems also participate in various other energy markets, each having differing requirements and trading frequencies. As mentioned above, an operator is typically involved in a decades-long power purchase agreement while simultaneously providing frequency regulation services on the scale of seconds. The wide variety of trading frequencies, in combination with the volatility of energy prices, contributes further complexity and uncertainty to the operation of renewable energy systems. Thus, there is an urgent need for system policies that can account for the uncertainties of generating and trading renewable energy.

By applying a model to analyze the massive amounts of data associated with the highly complex energy market as well as the uncertain nature of renewable energy systems, the disclosed system can ensure that renewable energy infrastructure quickly integrates into energy markets. In this way, the disclosed system can enable a transition away from fossil fuel systems with minimal negative impact on operations. In addition, by utilizing a model to compute control policies, the disclosed system may adapt over time and continually improve policy actions to maximize efficiency, reliability, and/or revenue.

Furthermore, as mentioned above and described further below, the model can be configured with various constraints to ensure that a resultant policy is realistic and feasible for a given renewable energy system. For instance, the model is configured with technical constraints such as maximum battery capacity and maximum charge rate. By tailoring policies to these constraints, the system minimizes the processing time for generating a feasible policy thereby conserving computing resources and streamlining the user experience for energy system operators.

Various examples, scenarios, and aspects that enable multi-market resource optimization through data-driven models are described below with reference to FIGS. 1-5.

FIG. 1 illustrates an example system 100 in which a renewable energy generator 102A and/or 102B produce energy 104 which is then stored in an energy storage 106. In various examples, the renewable energy generators 102 is wind 102A, solar 102B, or any other renewable energy system. In addition, energy storage 106 can be any suitable storage method such as batteries, pumped hydro storage, and the like. As mentioned above, the energy storage 106 enables a system operator to minimize fluctuations in production capacity of the renewable energy generators 102. In various examples, energy storage 106 is modeled mathematically for ease of analysis.

Energy 104 is subsequently dispatched from the energy storage 106 to a short-term market 108 for a specified energy price 110. Short-term markets 108 can include real-time energy markets, day-ahead markets, frequency regulation, and other such markets that operate on the scale of seconds to hours. Energy 104 may also be dispatched to a long-term market 112 such as power purchase agreements mentioned above. Long-term markets 112 are typically governed by associated agreement terms 114 which include an agreed upon price for the energy 104 as well as penalties for failure to deliver the energy 104. In a specific example, energy storage 106 contains $N_b$ storage devices. Each storage device possesses an associated state-of-charge (SOC) representing how much energy in watt-hours (Wh) at a time t, which can be denoted as $X_{b,t}$.

In combination, the renewable energy generator 102, energy storage 106, short-term market 108, and long-term market 112 form an environment 116. In various examples, the environment 116 is any space which a model 118 can analyze and manipulate. Generally described, the model 118 extracts a state 120 from the environment 116 that defines various aspects of the environment 116 such as available production capacity of the renewable energy generator 102, energy prices 110, existing agreement term(s) 114, and so forth. While the model 118 can utilize a machine learning technique such as reinforcement learning, any suitable method can be utilized to implement the model 118. In one example, a statistical rule-based method is be used to implement the disclosed techniques.

Based on the state 120, the model 118 computes a policy 122 for controlling the resource generation system 202. In various examples, the policy 122 directs the renewable energy generator 102 to charge the batteries at the energy storage 106, dispatch energy 104 to the short-term market 108 and/or the long-term market 112, and so forth. With respect to the energy storage 106, the acts of charging and discharging a storage device are also mathematically modeled to enable the model 118 to analyze and manipulate the environment 116. In a specific example, the act of charging the energy storage 106 is represented by $U_{b,t}^+$ while discharging the energy storage is represented by $U_{b,t}^-$. Thus, in one example, the SOC for a particular storage device of the energy storage 106 is represented as follows in equation (1):

$$X_{b,t+1}=X_b+f_b^+(U_{b,t}^+)-f_b^-(U_{b,t}^-) \qquad \text{equation (1)}$$

In addition, the act of charging and discharging the energy storage 106 includes an associated cost for each storage device which is represented by a cost function $C_b$. In general, the cost function depends explicitly on the SOC and the particular charge/discharge directions of the policy 122 as well as any previously realized policies 122. In one example, the cost function is represented as follows in equation (2):

$$C_{b,t}=(X_b[0:t],U_b^+[0:t],U_b^-[0:t]) \qquad \text{equation (2)}$$

Here, $X_b[0:t]$ represents the SOC values up to time t.

Furthermore, modeling the renewable energy generator 102 is another key consideration of the system 100. In one example there are $N_R$ renewable energy generators 102 where a variable $x_{r,t}$ represents the amount of power in Watts (W) that a particular renewable energy generator 102 produces in a time t. While $x_{r,t}$ is reduced, power generation cannot be increased beyond a maximum nameplate capacity that is specific to the hardware used to implement the system 100.

As mentioned above, the model 118 can also be configured with constraints that ensure the policy 122 is feasible for a given factors of the environment 116, such as a maximum power generation, SOC, and other factors. For instance, the renewable energy generators 102 and energy storage 106 are connected to the greater power grid by a point of common coupling (PCC) which must satisfy the laws of power flow which is represented as follows in equation (3):

$$x_t^{PCC}=\Sigma_b(U_{b,t}^- - U_{b,t}^+)+\Sigma_r x_{r,t} \Sigma_i \hat{x}_{i,t} \qquad \text{equation (3)}$$

To account for multiple markets such as the short-term market 108 and the long-term market 112, x3 is divided between short-term and long-term quantities. In the context of the system 100, the model 118 seeks to learn an optimal tradeoff between the quantity of energy 104 that is committed to the short-term market 108 versus the long-term market 112. In one example, this power balance equation is represented as follows in equation (4):

$$x_t^{ST}+x_t^{LT}=\Sigma_b(U_{b,t}^- - U_{b,t}^+)+\Sigma_r x_{r,t} \Sigma_i \hat{x}_{i,t} \qquad \text{equation (4)}$$

It should be understood that equation (4) can be modified to include any number of markets such as real-time energy markets, frequency regulation, day-ahead markets, and so forth. In addition, equation (4) can be further modified to include losses and congestion within the environment 116.

Accordingly, the model 118 makes decisions based on the models described above to compute the policy 122. As a result of applying the policy 122, the model 118 extracts an updated state 120 as well as an optimality 124 that quantifies how successful the policy 122 was within the environment 116.

In a specific example, the optimality 124 represents the profit obtained by the operator at each point in time for delivering energy 104 to the short-term market 108 and the long-term market 112. In one example, this profit is represented as follows in equation (5):

$$R_t(X_t,U_t)=P^{ST}(X_t)+P^{LT}(X_t^{LT})-C(X_t,U_t) \qquad \text{equation (5)}$$

Here, $P^{ST}(X_t)$ is the profit/loss function for the short-term market 108, $P^{LT}(X_t^{LT})$ is the profit/loss function for the long-term market 112, and $C(X_t, U_t)$ is a cost function which accounts for storage degradation and renewable curtailment. In this way, the model 118 extracts an aggregated optimality 124 that is computed using individual measures of optimality from each of the markets.

As such, the objective of the model is to learn an optimal policy $\pi \in \Pi$ to determine an action $U_t$ at each time t for the environment 116. In one example, the optimal policy $\pi$ maximizes profit obtained by the operator in the short-term market 108 and the long-term market 112. This is represented by the following equations:

$$\max_{x_t, u_t, \forall t} \sum_{t=1}^{T} \mathbb{E} w_t \left[ P(x_t^{ST}) + P(x_t^{LT}) - C(x_t, u_t) \right] \quad \text{equation (6)}$$

$$\text{s.t. } x_{t+1} = f(x_t, u_t) \forall t \quad \text{equation (7)}$$

$$x_t \in \mathcal{X}_t(W_t) \forall t \quad \text{equation (8)}$$

$$u_t \in \mathcal{U}_t \forall t \quad \text{equation (9)}$$

Here $\mathbb{E} w_t$ represents exogenous parameters such as renewable production and energy price 110. $P(x_x^{ST})$ represents profit from the short-term market 108, $P(x_t^{LT})$ represents profit from the long-term market 112 and $C(x_t, u_t)$ represents various costs. The outcome of this equation is subject to $x_{t+1} = f(x_t, u_t) \; \forall t$ which represents system transition dynamics, $x_t \in X_t(W_t) \; \forall t$ which represents a system state such as the SOC of energy storage 106, renewable production, and market commitments in light of system constraints, and $u_t \in \mathcal{U}_t \; \forall t$ which represents an action such as battery charge/discharge as dictated by action constraints such as charge rate limits.

While the above examples define profit as the optimality 124, it should be understood that the optimality 124 can represent any chosen measure of success for the policy 122. For instance, the optimality 124 represents the total profits from trading the energy 104 at the markets 108 and 112. In another example, the optimality 124 can represent the quality of service of the renewable energy generator 102. In addition, the above equation can be modified to accommodate any number of markets instead of, or in addition to, the two specifically mentioned.

The model 118 subsequently analyzes the updated state 120 and optimality 124 to generate a new iteration of the policy 122. As discussed, the ultimate objective of the model 118 is to learn an optimal policy 122 that maximizes the optimality 124 through repeated interactions with the environment 116.

Figure 2A:
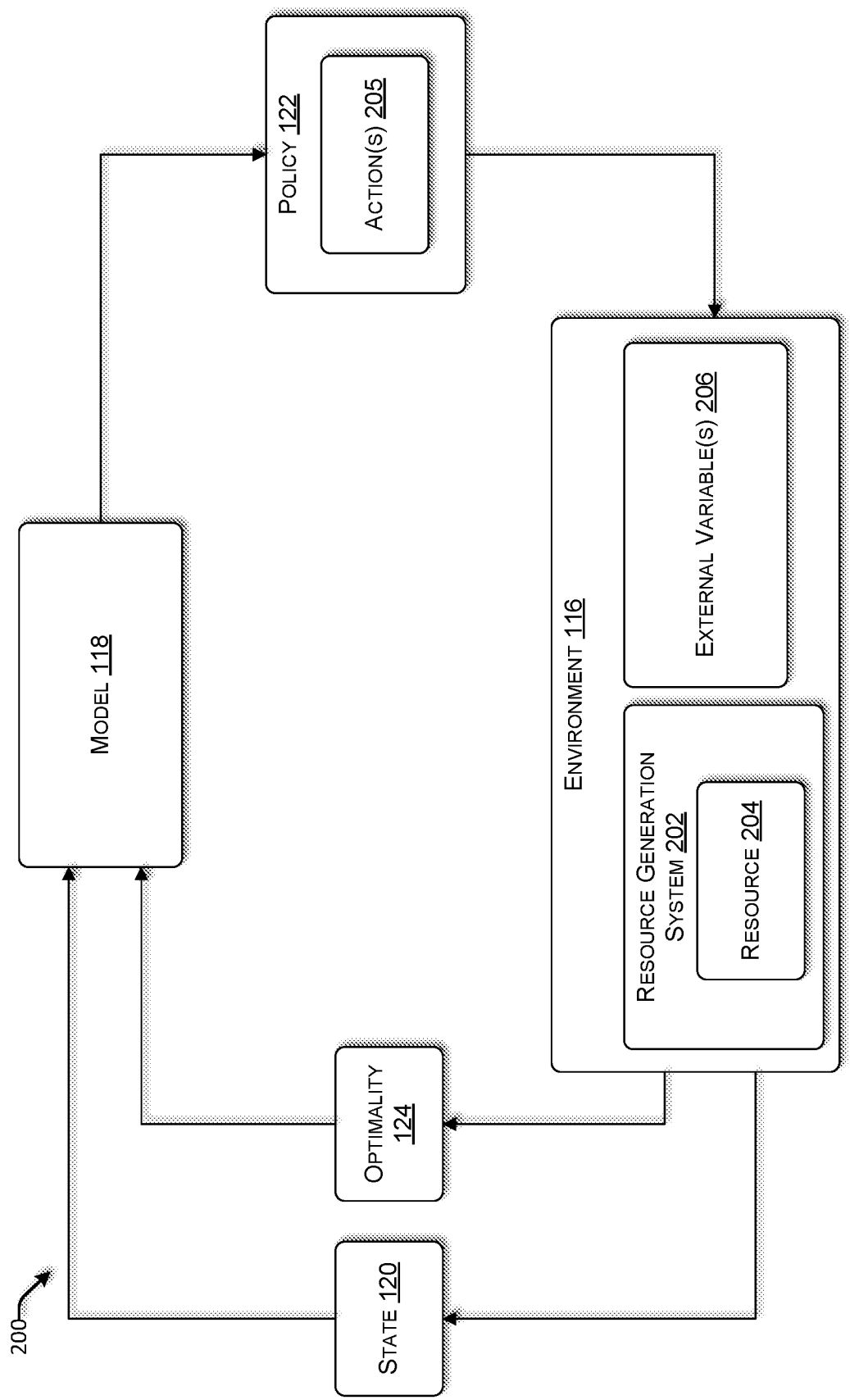
FIG. 2A illustrates a system for utilizing a model to compute policies for controlling resource generation and distribution.

Turning now to FIG. 2A, aspects of a resource generation and distribution system 200 are shown and described. As mentioned above, while the examples described herein may have specific applicability to renewable energy systems, the disclosed techniques can be used in association with any resource generation system 202 in which the rate at which the associated resource 204 is generated varies over time. For instance, part of the resource generation system 202 are resource generation entities such as farms in which the resource 204 can be an agricultural product such as grain. In this example, the grain is dispatched to various commodity markets having various trading frequencies, pricing, and the like, which are based on supply and/or demand. Within the environment 116, the generation and distribution of the resource 204 are governed by a policy 122 defining various actions 205 and subject to various external variables 206.

The external variables 206 includes a generation capacity of the resource 204, demand and associated pricing for the resource 204, and the like.

The actions 205 are determined by the model 118 based on a state 120 which is retrieved from the environment 116. As will be discussed below, the state 120 defines various aspects of the environment 116 to enable the model 118 to make informed decisions. As described above, applying the actions 205 defined by the policy 122 to the environment 116, the model 118 extracts an optimality 124 which quantifies the level of success of the policy 122 within the environment 116.

Proceeding to FIG. 2B, a first state of the iterative policy process is shown and described. As mentioned above, the model 118 retrieves a state 120 from the environment 116. The state 120 defines a level of generation for the resource generation system 202, current demand for the resource 204, market commitments, an amount of the resource 204 available in storage, and other external variables 206. In subsequent iterations, the state 120 also includes information on policies 122 that were implemented in previous iterations. For instance, the state 120 defines actions 205 that were previously applied to the environment 116.

Figure 2C:
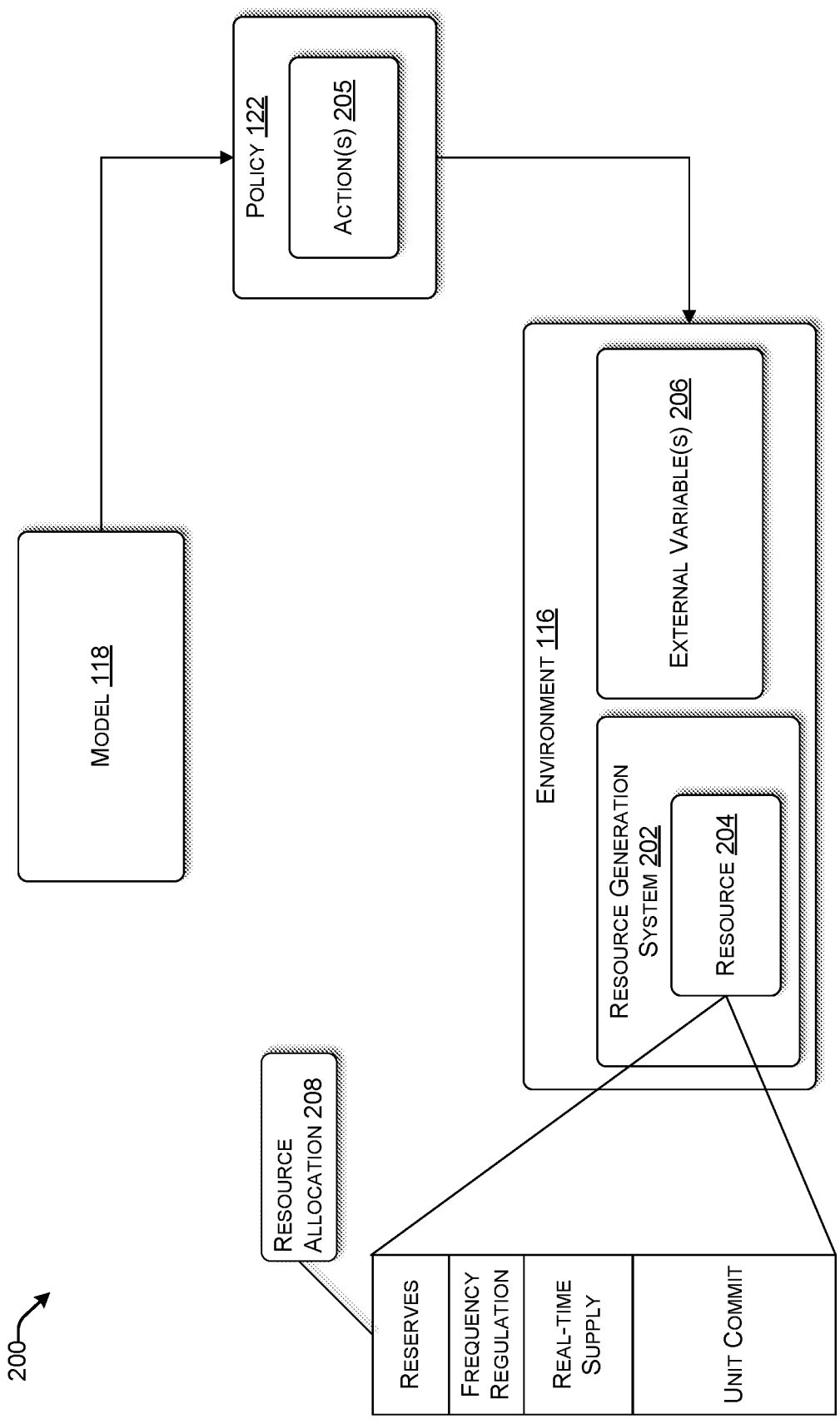
FIG. 2C illustrates a second state of the system for utilizing a model to compute policies for controlling resource generation and distribution.

Next, at FIG. 2C, the model 118 computes a policy 122 which defines various actions 205 for implementation within the environment 116. As discussed above with respect to a renewable energy generation system, the policy directs the resource generation system 202 to utilize available generation capacity, store a certain amount of resource 204, dispatch the resource 204 to various resource markets, and the like. These operations are achieved by defining a set of discrete actions 205 within a policy 122. In various examples, the actions 205 are performed at regular time intervals (e.g., at each time t). Alternatively, the actions 205 are defined for certain periods of time. In one example, an action 205 directs the resource generation system 202 to produce and store the resource 204 for two hours and then dispatch the resource 204 for thirty minutes.

As shown, in one example resource 204 are partitioned into a resource allocation 208 for various markets as described above. The resource allocation 208 dictates a quantity of the resource 204 that is dispatched to each market. For example, in the context of electrical energy, a certain quantity of the resource 204 is dispatched to fulfill long-term commitments (e.g., unit commit), while a different quantity of the resource 204 is dispatched to short-term markets such as real-time supply and frequency regulation, and/or to reserves. The timing and proportion of the resource 204 that is dispatched to these various areas is dictated by the policy 122, and as discussed further below change over time.

Figure 2D:
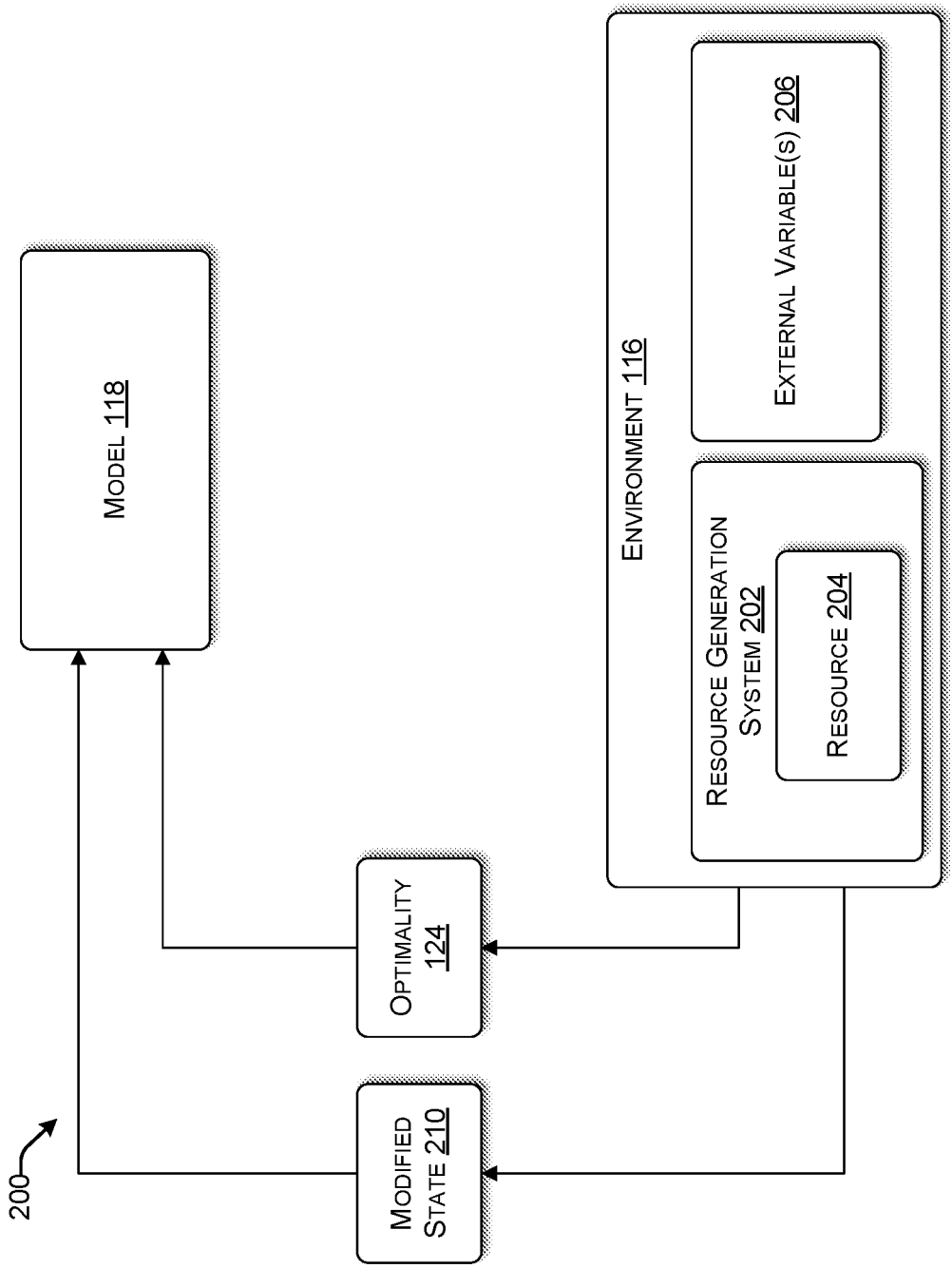
FIG. 2D illustrates a third state of the system for utilizing a model to compute policies for controlling resource generation and distribution.

In response to executing the actions 205 defined by the policy 122, the model 118 extracts a modified state 210 as well as an optimality 124 from the environment 116, as shown in FIG. 2D. As described above, the optimality 124 quantifies the level of success of the policy 122 within the environment 116. In many examples, the optimality 124 of a policy 122 is represented numerically as shown above with respect to FIG. 1. While the optimality 124 can represent profit obtained from trading the resource 204, if should be understood that the optimality 124 can represent any other suitable measure of success for the policy 122 such as efficiency, the amount of delivered resource 204 and the like. In addition, the modified state 210 defines various aspects of the environment 116 that were changed due to the actions 205 defined by the policy 122. In various examples, the modified state 210 omits information that has not changed from the previous state 120. For instance, if the available generation capacity at the resource generation system 202 has not changed, the modified state 210 refrains from reporting the current generation capacity to the model 118.

Figure 2E:
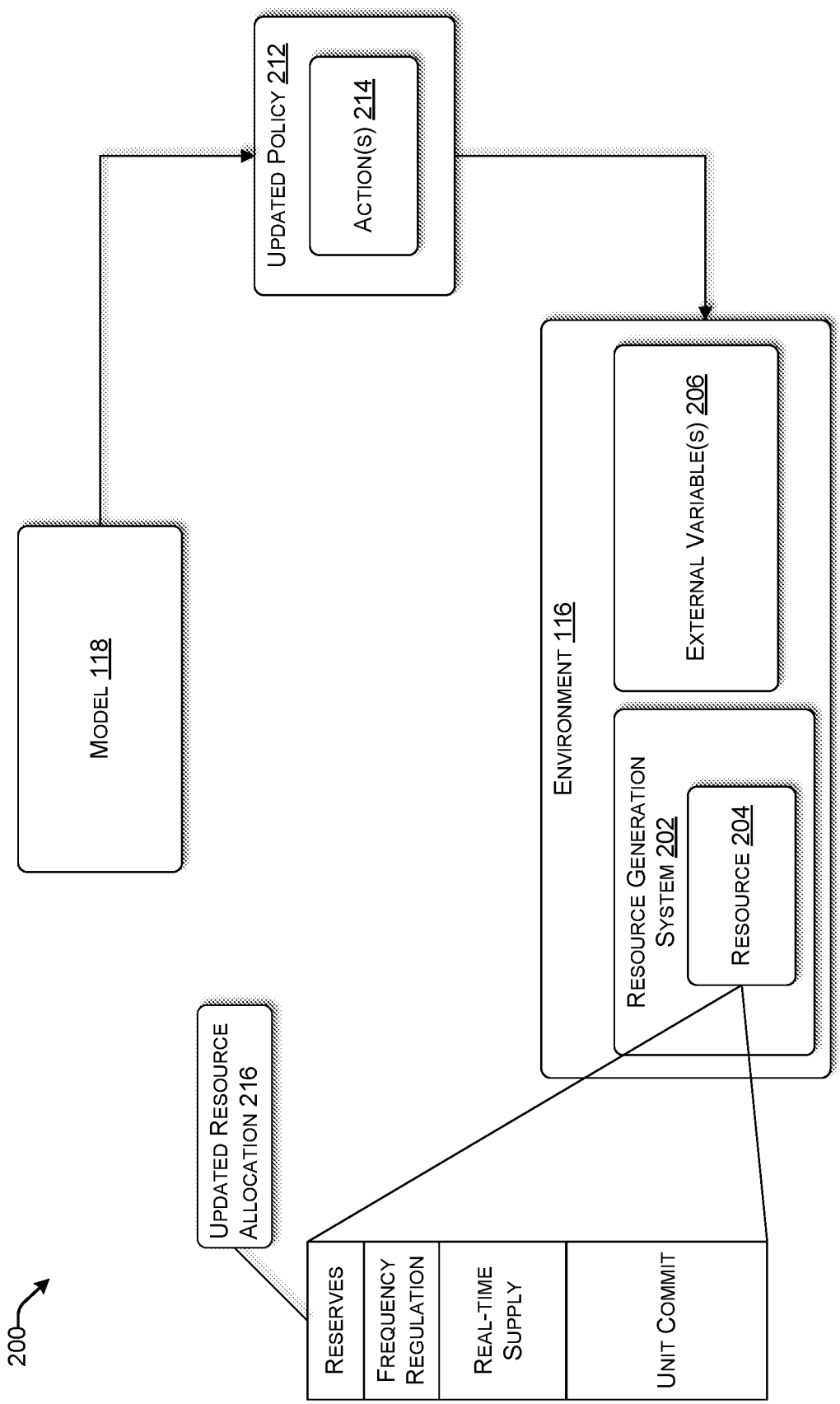
FIG. 2E illustrates a fourth state of the system for utilizing a model to compute policies for controlling resource generation and distribution.

Turning now to FIG. 2E, based on the modified state 210 and the optimality 124, the model 118 generates a new iteration of the policy 122 or updated policy. The updated policy 212 defines a set of actions 214 that is changed from the initial set of actions 205 defined by the policy 122. In a specific example, the model 118 may identify that optimality potentially increases if the resource 204 is dispatched a certain time of day. In another example, the model 118 may determine that dispatching the resource 204 to a different resource market leads to increased optimality (e.g., increased revenue). It should be understood that the process described with respect to FIGS. 2A-2E can be repeated for any number of iterations to determine an optimal policy 122. Alternatively, the system 200 can be configured to iterate for a predetermined amount of time or a predetermined number of iterations. In addition, the actions 214 defined by the updated policy 212 can modify the previous resource allocation 208 of FIG. 2C to generate an updated resource allocation 216 that includes modified proportions for each category. For instance, a reduced amount of the resource is directed to reserves with an increase in real-time supply.

Figure 3:
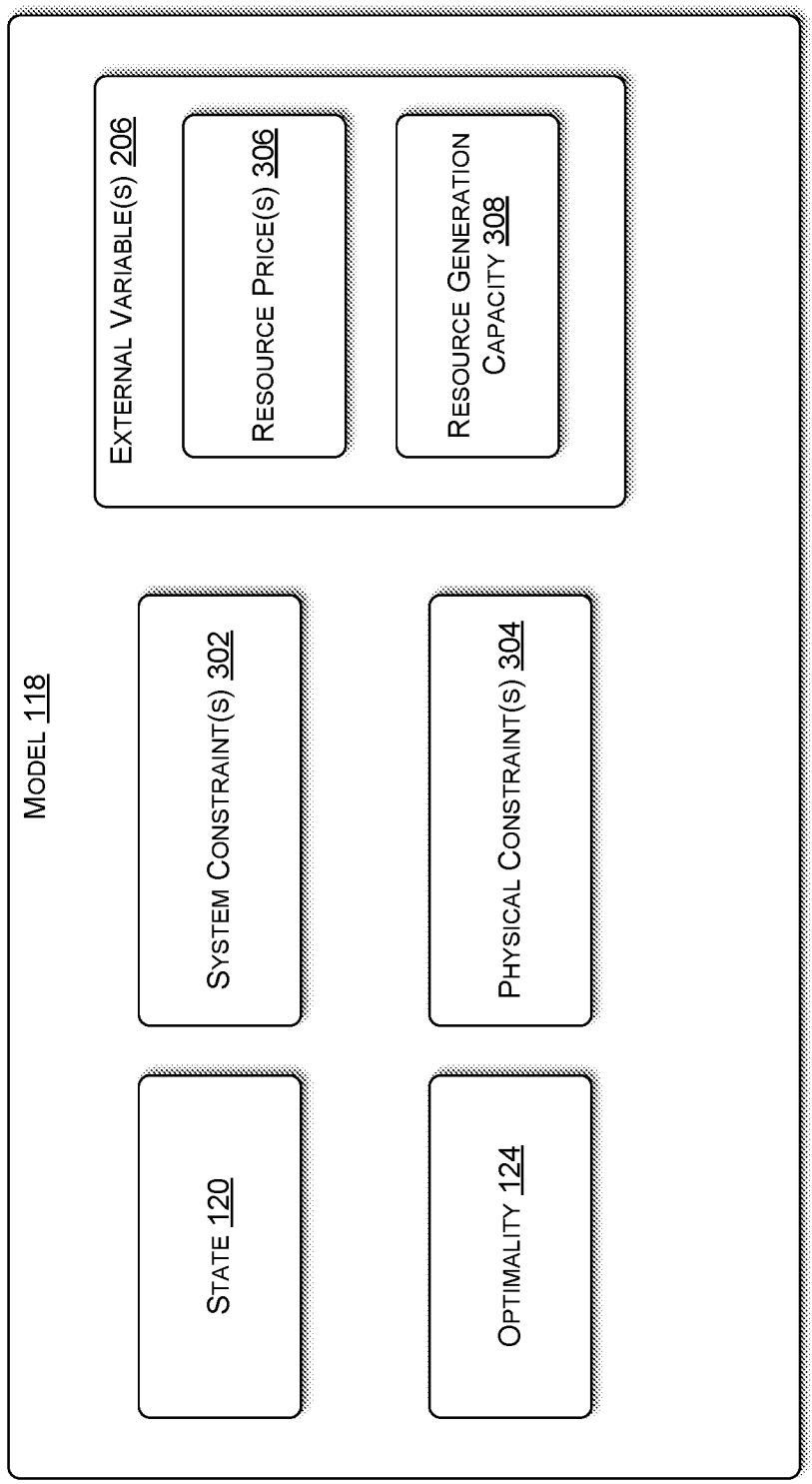
FIG. 3 illustrates aspects of the model for computing policies for controlling resource generation and distribution.

Proceeding to FIG. 3, additional aspects of the model 118 are shown and described. As mentioned above, the model 118 extracts data defining a state 120 and an optimality 124 from an environment 116. Accordingly, the state 120 and optimality 124 is used to inform policies 122 and associated actions 205. In addition, the model 118 is configured with various constraints 302 and 304 to ensure that resultant policies 122 are realistic and technical feasible for a given resource generation system 202.

For instance, system constraints 302 include various technical limitations of the various components of the resource generation system 202 such as a maximum storage capacity of the resource 204, a maximum storage rate, a maximum generation rate, and so forth. In addition, physical constraints 304 can define physical laws that the model 118 cannot violate under any circumstances as doing so would render a policy 122 useless in real-world applications. In this way, the model 118 is constrained to only produce policies that can be realistically implemented whereas naïve applications of a model 118 would result in many policies that would have to be discarded as physically impossible.

Furthermore, the model 118 can be configured with external variables 206 which can include resource prices 306 as well as resource generation capacity 308. External variables 206 can be separated from the state 120 as external variables tend to be uncertain. Stated another way, source of uncertainty within the environment 116 can be grouped together under external variables 206. In this way, the model 118 can approach generation of policies 122 with fine granularity and clear identification of the sources of uncertainty.

Figure 4:
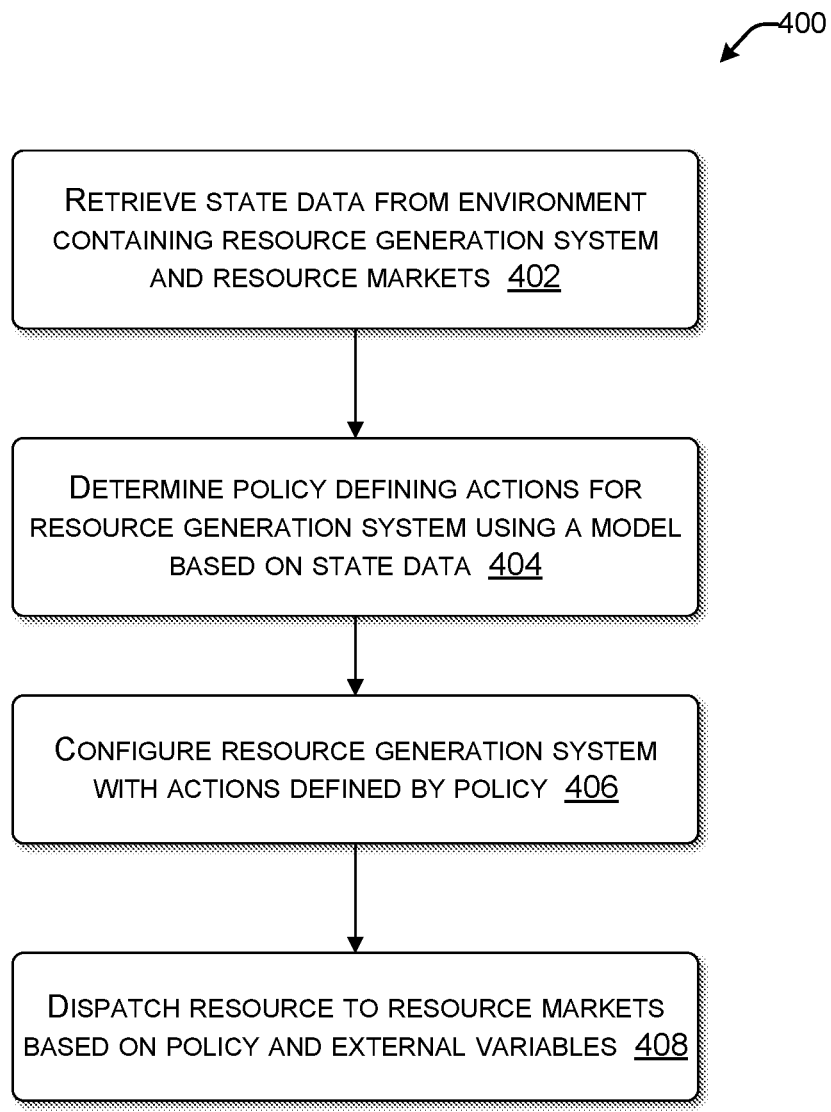
FIG. 4 is a flow diagram showing aspects of a routine for computing a control policy for the resource generation and distribution system.

Turning now to FIG. 4, aspects of a routine 400 for enabling optimized policy generation for resource generation systems through data-driven models are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 4, routine 400 begins at operation 402 where a system retrieves data defining a current state from an environment containing a resource generation system and a plurality of resource markets.

Next, at operation 404, a model determines a policy based on the state data.

Then at operation 406, the resource generation system is configured with the policy.

Finally, at operation 408 the resource generation system dispatches resources produced by the resource generation system to at least some of the plurality of resource markets according to the policy as well as external variables such as generation capacity and resource pricing.

Figure 5:
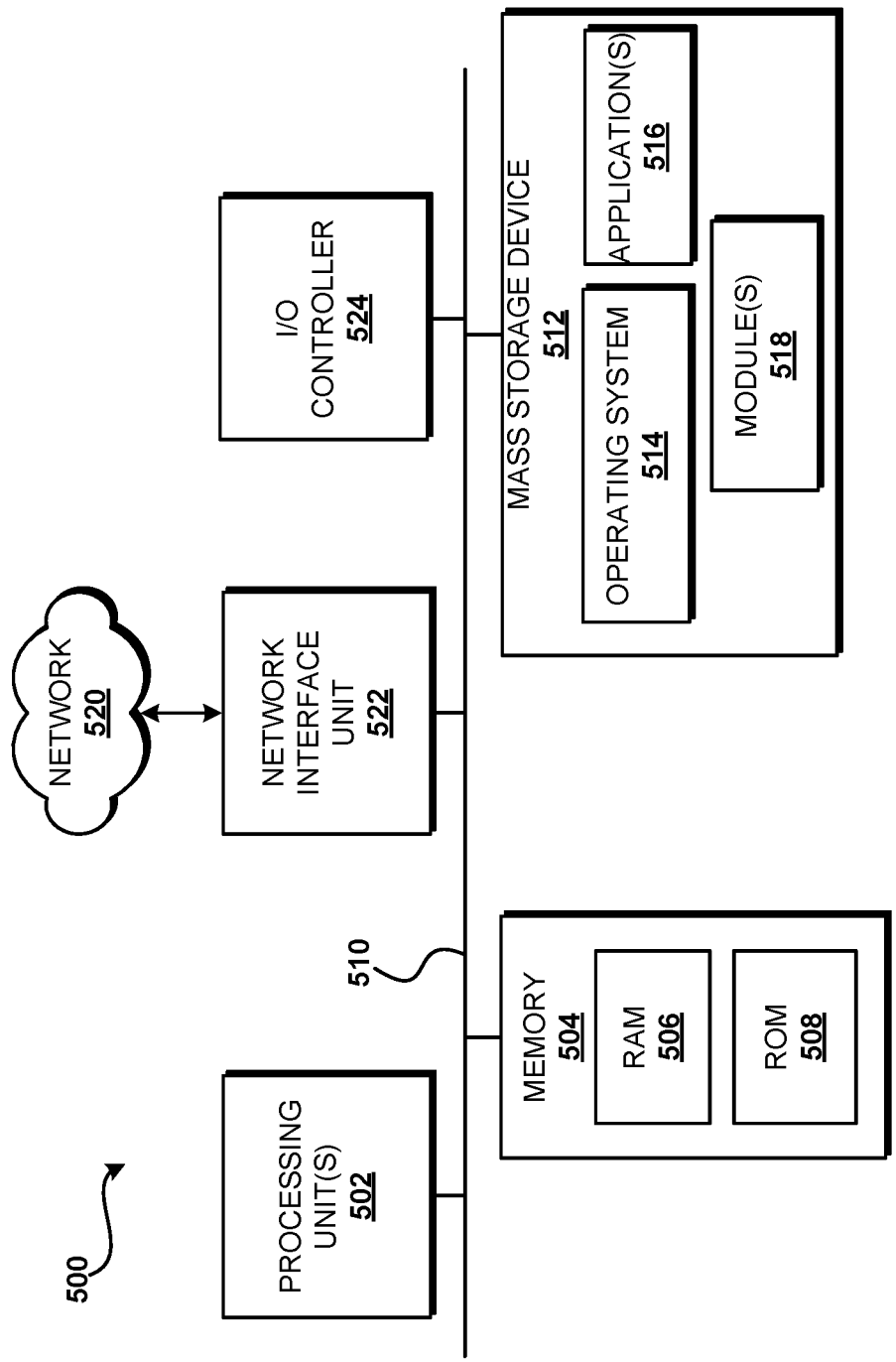
FIG. 5 is a diagram illustrating a distributed computing environment capable of implementing aspects of the techniques and technologies presented herein.

FIG. 5 shows additional details of an example computer architecture 500 for a device, such as a computer or a server configured as part of the system 100, capable of executing computer instructions (e.g., a module or a program component described herein). The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

The disclosure presented herein also encompasses the subject matter set forth in the following clauses.

Example Clause A, a method comprising: retrieving, using a processing system one or more processing units, data defining a current state from an environment containing a resource generation system and a plurality of resource markets; determining, using a model, a policy that is applied to the resource generation system in the environment based on the current state; configuring the resource generation system using the policy; and dispatching a resource of the resource generation system to at least two of the plurality of resource markets based on the policy and one or more external variables that have an effect on a timing and a quantity of the resource that is dispatched to the at least two resource markets.

Example Clause B, the method of Example Clause A, wherein the resource is electrical energy and wherein the resource generation system is a renewable energy system.

Example Clause C, the method of Example Clause A or Example Clause B, wherein the resource is an agricultural product and wherein the resource generation system comprises a farm.

Example Clause D, the method of any one of Example Clauses A through C, wherein a rate at which the resource generation system generates the resource varies over time.

Example Clause E, the method of any one of Example Clauses A through D, wherein individual resource markets of the plurality of resource markets comprise a differing trading frequency.

Example Clause F, the method of any one of Example Clauses A through E, wherein the one or more external variables comprises a current resource price and a resource generation rate.

Example Clause G, the method of any one of Example Clauses A through F, further comprising: retrieving a modified state from the environment in response to the policy determined by the machine learning model; determining a level of optimality based on the modified current state and the application of the policy in the environment; and modifying one or more actions of the policy to increase the level of optimality.

Example Clause H, the method of Example Clause G, wherein the level of optimality comprises a plurality of optimality levels associated with each of the plurality of resource markets.

Example Clause I, a system comprising: one or more processing units; and computer storage media having encoded thereon computer-readable instructions that when executed by the, causes the system to: retrieve data defining a current state from an environment containing a resource generation system and a plurality of resource markets; determine, using a model, a policy that is applied to the resource generation system in the environment based on the current state; configure the resource generation system using the policy; and dispatch a resource of the resource generation system to at least two of the plurality of resource markets based on the policy and one or more external variables that have an effect on a timing and a quantity of the resource that is dispatched.

Example Clause J, the system of Example Clause I, wherein a rate at which the resource generation system generates the resource varies over time.

Example Clause K, the system of Example Clause I or Example Clause J, wherein individual resource markets of the plurality of resource markets comprise a differing trading frequency.

Example Clause L, the system of any one of Example Clause I through K, wherein the one or more external variables comprises a current resource price and a resource generation rate.

Example Clause M, the system of any one of Example Clause I through L, wherein the computer-readable instructions further cause the system to: retrieve a modified state from the environment in response to the policy determined by the machine learning model; determine a level of optimality based on the modified current state and the application of the policy in the environment; and modify one or more actions of the policy to increase the level of optimality.

Example Clause N, Example Clause M, wherein the level of optimality comprises a plurality of optimality levels associated with each of the plurality of resource markets.

Example Clause O, a computer-readable storage medium, having encoded thereon computer-readable instructions that when executed by one or more processing units, cause a system to: retrieve data defining a current state from an environment containing a resource generation system and a plurality of resource markets; determine, using a model, a policy that is applied to the resource generation system in the environment based on the current state; configure the resource generation system using the policy; and dispatch a resource of the resource generation system to at least two of the plurality of resource markets based on the policy and one or more external variables that have an effect on a timing and a quantity of the resource that is dispatched.

Example Clause P, the computer-readable storage medium of Example Clause O, wherein a rate at which the resource generation system generates the resource varies over time.

Example Clause Q, the computer-readable storage medium of Example Clause O or Example Clause P, wherein individual resource markets of the plurality of resource markets comprise a differing trading frequency.

Example Clause R, the computer-readable storage medium of any one of Example Clause O through Q, wherein the one or more external variables comprises a current resource price and a resource generation rate.

Example Clause S, the computer-readable storage medium of any one of Example Clause O through R, wherein the computer-readable instructions further cause the system to: retrieve a modified state from the environment in response to the policy determined by the model; determine a level of optimality based on the modified current state and the application of the policy in the environment; and modify one or more actions of the policy to increase the level of optimality.

Example Clause T, the computer-readable storage medium of Example Clause S, wherein the level of optimality comprises a plurality of optimality levels associated with each of the plurality of resource markets.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different markets, two different external variables, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
retrieving, using a processing system comprising one or more processing units, data defining a current state from an environment containing a resource generation system, a resource purchase agreement market operating on a first timescale comprising years, and a frequency regulation service market operating on a second timescale comprising seconds;
determining, using a model, a policy that is applied to the resource generation system in the environment based on the current state;
configuring the resource generation system using the policy;
dispatching a resource of the resource generation system to the resource purchase agreement market and the frequency regulation service market in accordance with the policy and one or more external variables affecting a timing and a quantity of the resource that is dispatched to the resource purchase agreement market and the frequency regulation service market;
retrieving update data defining a modified state from the environment, the modified state resulting from dispatching the resource to the resource purchase agreement market and the frequency regulation service market in accordance with the policy;
calculating an optimality based on the modified state, the optimality quantifying a level of success of the policy with respect to the resource purchase agreement market and the frequency regulation service market; and
modifying, by the model, one or more actions of the policy to increase the optimality.

2. The method of claim 1, wherein the resource is electrical energy and wherein the resource generation system is a renewable energy system.

3. The method of claim 1, wherein a rate at which the resource generation system generates the resource varies over time.

4. The method of claim 1, wherein the resource purchase agreement market and the frequency regulation service market comprise a first service type and a second service type, respectively.

5. The method of claim 1, wherein the one or more external variables comprises a current resource price and a resource generation rate.

6. A system comprising:
a processing system comprising one or more processing units; and
computer storage media having encoded thereon computer-readable instructions that when executed by the processing system, causes the system to:
retrieve data defining a current state from an environment containing a resource generation system, a resource purchase agreement market operating on a first timescale comprising years, and a frequency regulation service market operating on a second timescale comprising seconds;
determine, using a model, a policy that is applied to the resource generation system in the environment based on the current state;
configure the resource generation system using the policy;
dispatch a resource of the resource generation system to the resource purchase agreement market and the frequency regulation service market in accordance with the policy and one or more external variables affecting a timing and a quantity of the resource that is dispatched to the resource purchase agreement market and the frequency regulation service market;
retrieve update data defining a modified state from the environment, the modified state resulting from dispatching the resource to the resource purchase agreement market and the frequency regulation service market in accordance with the policy;
calculate an optimality based on the modified state, the optimality quantifying a level of success of the policy with respect to the resource purchase agreement market and the frequency regulation service market; and
modify, by the model, one or more actions of the policy to increase the optimality.

7. The system of claim 6, wherein a rate at which the resource generation system generates the resource varies over time.

8. The system of claim 6, wherein the resource purchase agreement market and the frequency regulation service market comprise a first service type and a second service type, respectively.

9. The system of claim 6, wherein the one or more external variables comprises a current resource price and a resource generation rate.

10. A computer-readable storage media, having encoded thereon computer-readable instructions that when executed by one or more processing units, cause a system to:
retrieve data defining a current state from an environment containing a resource generation system, a resource purchase agreement market operating on a first timescale comprising years, and a frequency regulation service market operating on a second timescale comprising seconds;
determine, using a model, a policy that is applied to the resource generation system in the environment based on the current state;
configure the resource generation system using the policy;
dispatch a resource of the resource generation system to the resource purchase agreement market and the frequency regulation service market in accordance with the policy and one or more external variables affecting a timing and a quantity of the resource that is dispatched to the resource purchase agreement market and the frequency regulation service market;
retrieve update data defining a modified state from the environment, the modified state resulting from dispatching the resource to the resource purchase agreement market and the frequency regulation service market in accordance with the policy;
calculate an optimality based on the modified state, the optimality quantifying a level of success of the policy with respect to the resource purchase agreement market and the frequency regulation service market; and
modify, by the model, one or more actions of the policy to increase the optimality.

11. The computer-readable storage media of claim 10, wherein a rate at which the resource generation system generates the resource varies over time.

12. The computer-readable storage media of claim 10, wherein the resource purchase agreement market and the frequency regulation service market comprise a first service type and a second service type, respectively.

13. The computer-readable storage media of claim 10, wherein the one or more external variables comprises a current resource price and a resource generation rate.

* * * * *